H. Merrill,
Spike.
N° 59,434.    Patented Nov. 6, 1866.
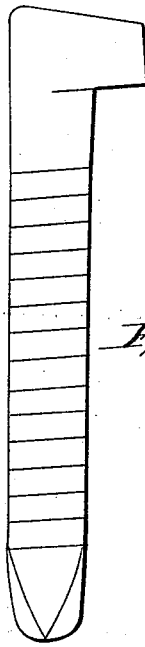
Fig: 1.
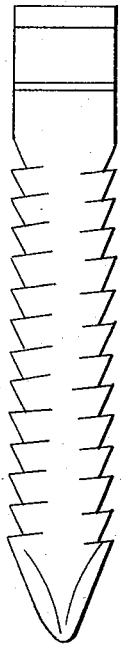
Fig: 2.
Fig: 3.
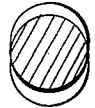
Fig: 4.
Witnesses:
Inventor:
Helen Merrill

UNITED STATES PATENT OFFICE.

HELEM MERRILL, OF BROOKLYN, NEW YORK.

IMPROVEMENT IN SPIKES.

Specification forming part of Letters Patent No. 59,434, dated November 6, 1866.

*To all whom it may concern:*

Be it known that I, HELEM MERRILL, of Brooklyn, in the county of Kings and State of New York, have invented a certain new and useful Improvement in Spikes; and I do hereby declare that the following is a full, clear, and exact description of the same, reference being had to the accompanying drawings, making a part of this specification, and to the several figures marked thereon.

Spikes have been hitherto made with threads that can be screwed into wood for securing rails to ties and other purposes of fastening; and they have also been made with a rectangular section in a twisted form, so that the body of the spike forms a screw with about a single turn, by which the screw-spike thus formed, when driven into the wood, holds with an increased tenacity, approximating that of a screw-bolt. The screw in a screw-spike, however, is but slightly developed, and the advantages over a plain spike are but correspondingly small; and although it can be readily driven, it cannot be as easily removed; and when it may be necessary to drive it still further, the position of the head, which is important in a hook-headed spike, may be disadvantageously altered. With a screw-bolt there is the same difficulty with the head, only in a less degree; and they require in practical use to have a hole bored for their reception, although it is possible to make them so that they may be used without such preparation. But the most serious and controlling objection to them is that they are exceedingly expensive to make. Barbed and serrated spikes have also been made; but while their first cost has been but little more than that of plain spikes, they have been but little more effective, as they have had only a slight direct hold upon the wood, and have been wanting in provision for disposing of the displaced fibers.

The object of my invention is to make a spike that will hold as well, or nearly as well, as a perfect screw-bolt, and which may be as effectually driven as an ordinary spike, without preliminary boring, and which will cost but little more for its manufacture. To accomplish this object, my invention consists in forming a spike with a point that will properly dispose of the fibers in entering, and with barbs or portions of screw-threads on opposite sides, in such a manner that when the spike may be driven into wood and the fibers severed by the entering point, and crushed outward by the passage of the barbed sides or screw-threads, the wood opposite the smooth sides of the spike is but little injured; and when the spike is turned by the head one-quarter way round, so that the screw sides are turned into the sound wood, they hold the spike as firmly and make the fastening as securely as it could have been done by a completely-formed screw-bolt. By turning the spike back one-quarter round to its former position it may be again driven to make the fastening tighter, and then turned with the head in the proper position, or it may be drawn as an ordinary spike. As the barbs or partial screw-threads are merely on the opposite sides, they may be stricken up between dies at the same time and in the same operation with the formation of the head, and the cost of manufacture will therefore be but little more than that of plain spikes.

To enable others skilled in the art to which it appertains to make and use my invention, I will proceed to describe its construction and operation with reference to the drawings.

Figure 1 is an elevation of a hook-headed railroad-spike, exhibiting the flat side of the cutting-edge of the point and the barbs on one side. Fig. 2 is a similar elevation of one of the smooth sides, and shows the barbs on each side. Fig. 3 is a section across the body of the bolt; and Fig. 4 is a section of the point of the spike, showing the form which I give it there.

With reference to this last feature, the point should be made conical, with the addition of wings or ridges leading to the width of the spike, on the smooth sides, as indicated in the other figures, in addition to the section in Fig. 4. By this means the fibers opposite the smooth sides are disturbed as little as possible, for the reason that they are first severed across the grain, as with the ordinary chisel-pointed spike, and are then crowded in every direction from the center, as they would be by a sharp-pointed spike, with the modification that the increased thickness of the wings faces the fibers at those points longitudinally, instead of permitting them to wedge these transversely together and cause the wood to split.

I prefer to make the barbs in helical form, and disposed in regular sequence, as portions of a continuous screw-thread; but I make no claim simply to a barbed spike or to any arrangement of barbs; and they may be made merely as circular ridges, and on a straight or taper spike, and arranged regularly or not, as may be desired.

I claim—

As a new article of manufacture, a spike, pointed and ridged substantially as described.

HELEM MERRILL.

Witnesses:
 SWAIN WINKLEY,
 WM. KEMBLE HALL.